(12) United States Patent
Xue et al.

(10) Patent No.: US 9,907,007 B1
(45) Date of Patent: Feb. 27, 2018

(54) METHODS AND SYSTEMS FOR SELECTIVE SCANNING AND CONNECTING TO A WIRELESS NETWORK

(75) Inventors: Wen Xue, Overland Park, KS (US); Jay Cole, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 785 days.

(21) Appl. No.: 13/558,419

(22) Filed: Jul. 26, 2012

(51) Int. Cl.
  *H04W 24/00* (2009.01)
  *H04W 36/30* (2009.01)
  *H04W 88/06* (2009.01)

(52) U.S. Cl.
  CPC ........... *H04W 36/30* (2013.01); *H04W 88/06* (2013.01); *Y02B 60/50* (2013.01)

(58) Field of Classification Search
  USPC .............. 455/436, 437, 442, 441, 434, 41.2; 370/331, 332
  See application file for complete search history.

(56) References Cited

U.S. PATENT DOCUMENTS

| | | | |
|---|---|---|---|
| 6,385,460 B1* | 5/2002 | Wan .............................. | 455/515 |
| 6,879,600 B1 | 4/2005 | Jones et al. | |
| 7,200,397 B1 | 4/2007 | Jones et al. | |
| 8,160,611 B1 | 4/2012 | Oroskar | |
| 2002/0147024 A1 | 10/2002 | Wan | |
| 2003/0108009 A1* | 6/2003 | Petersen ............. | H04W 76/023 370/332 |
| 2006/0229075 A1* | 10/2006 | Kim et al. .................... | 455/436 |
| 2008/0058031 A1* | 3/2008 | Deprun ......................... | 455/574 |
| 2008/0144580 A1* | 6/2008 | Su .......................... | H04W 48/16 370/332 |
| 2008/0165737 A1* | 7/2008 | Uppala ................. | H04W 36/32 370/331 |
| 2009/0163212 A1* | 6/2009 | Hall et al. ..................... | 455/438 |
| 2009/0323609 A1* | 12/2009 | Walton .......................... | 370/329 |
| 2010/0240352 A1* | 9/2010 | Suri ...................... | H04W 48/16 455/419 |
| 2011/0059741 A1* | 3/2011 | Klein ............................ | 455/436 |
| 2013/0084856 A1* | 4/2013 | Prasad et al. ................. | 455/434 |
| 2013/0272264 A1* | 10/2013 | Ning et al. .................... | 370/331 |

OTHER PUBLICATIONS

Android Forums, "Switching Between WiFi & Verison .. H . . . ," androidforums.com/ .. .I13351-switching-.. , printed from the World Wide Web on Feb. 18, 2011.

* cited by examiner

*Primary Examiner* — Nay A Maung
*Assistant Examiner* — Erica Fleming-Hall (57) ABSTRACT

Methods and systems for selective scanning and connecting to a wireless network are described. In an example, a mobile device may be configured to scan for availability of a wireless network and measure, at the mobile device, signal strengths of a wireless signal from the wireless network. Also, the mobile device may be configured to determine a rate of signal strength change for the wireless signal from the wireless network based on the measured signal strengths; and compare the rate of signal strength change to a threshold value. If the rate of signal strength change is less than the threshold value, the mobile device may be configured to establish a connection with the wireless network; if not, the mobile device may be configured to stop scanning for the wireless network.

15 Claims, 6 Drawing Sheets

METHODS AND SYSTEMS FOR SELECTIVE SCANNING AND CONNECTING TO A WIRELESS NETWORK

BACKGROUND

It has become increasingly common for mobile wireless devices to support communication through multiple types of access networks. For example, cell phones now commonly include at least one cellular transceiver for communicating with a cellular network and further include a Wi-Fi interface for communicating with a wireless local area network, in addition to perhaps other interfaces.

When such a device is operating in one type of access network, it may be desirable for the device to scan for availability of coverage in another type of access network. An incentive for doing this may be to achieve reduced cost, higher signal strength, and/or faster communication speed.

OVERVIEW

The present application discloses embodiments that relate to selective scanning and connecting to a wireless network. In one aspect, the present application describes a method. The method may comprise a mobile device scanning for availability of a wireless network. The scanning may comprise measuring, at the mobile device, signal strengths of a wireless signal from the wireless network. The method also may comprise determining a rate of signal strength change for the wireless signal from the wireless network based on the measured signal strengths. The method further may comprise comparing the rate of signal strength change to a threshold value. The method also may comprise, if the rate of signal strength change is less than the threshold value, establishing a connection with the wireless network; and, if the rate of signal strength change is greater than the threshold value, the mobile device stopping the scanning.

In another aspect, the present application describes a non-transitory computer readable medium having stored thereon instructions executable by a processor of a mobile device to cause the mobile device to perform functions. The functions may comprise scanning for availability of a wireless network. The scanning may comprise measuring, at the mobile device, signal strengths of a wireless signal from the wireless network. The functions also may comprise determining a rate of signal strength change for the wireless signal from the wireless network based on the measured signal strengths. The functions further may comprise comparing the rate of signal strength change to a threshold value. The functions also may comprise, if the rate of signal strength change is less than the threshold value, establishing a connection with the wireless network; and, if the rate of signal strength change is greater than the threshold value, stopping the scanning.

In still another aspect, the present application describes a mobile device. The mobile device may comprise a first radio module for communication with a first wireless network. The mobile device also may comprise a second radio module for communication with a second wireless network. The mobile device further may comprise a processor. The mobile device also may comprise a memory, the memory storing instructions executable by the processor to cause the mobile device to perform functions. The functions may comprise scanning, using the first radio module, for availability of the first wireless network. The scanning comprises measuring, at the mobile device, signal strengths of a wireless signal from the first wireless network. The functions also may comprise determining a rate of signal strength change for the wireless signal from the first wireless network based on the measured signal strengths. The functions further may comprise comparing the rate of signal strength change to a threshold value. The functions also may comprise, if the rate of signal strength change is less than the threshold value, establishing a connection with the wireless network; and, if the rate of signal strength change is greater than the threshold value, stopping the scanning.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Mobile data offloading, also called data offloading, can be defined as use of complementary network technologies for delivering data originally targeted for cellular networks (e.g., wireless wide area networks). In an example, rules triggering data offloading action can either be set by an end-user (mobile subscriber) or a network operator. Computer code or instructions applying the rules may reside in an end user device, in a server or may be divided between the end user device and the server. For end users, mobile data offloading can reduce cost of data service and can provide higher bandwidths. For network operators, mobile data offloading can reduce congestion of cellular networks. Example network technologies used for the mobile data offloading may include Wi-Fi, Femtocell, and Integrated Mobile Broadcast. Wi-Fi technology is a different radio technology than cellular network technology; however, internet capable mobile devices may be configured to include Wi-Fi capability as well as cellular network technology. Wi-Fi networks may exist in areas such as airports, hotels, and city centers.

Coupling between cellular and Wi-Fi networks can be referred to as either loose coupling or tight coupling. Enhanced Generic Access Network (EGAN) architecture may apply tight coupling and may specify rerouting of cellular network signaling through a Wi-Fi access network. An approach for loose coupling may be referred to as Interworking Wireless Local Area Network (IWLAN) architecture, which may be configured to transfer Internet Protocol (IP) data between a mobile device and an operator's core network using Wi-Fi. In an example, in the IWLAN architecture, a mobile device may be configured to open a Virtual Private Network (VPN) or an Internet Protocol Security (IPsec) tunnel from the mobile device to a dedicated IWLAN server in the operator's core network to provide a user with access to the Internet.

In one example, to offload data to the Wi-Fi network, a mobile device may be configured to have a direct connection to the Internet, i.e., no coupling. For many applications, there may be no added value to route data through the operator core network. In such cases, offloading can be carried out by switching IP traffic to use the Wi-Fi connection in the mobile device instead of the cellular data connection. In this approach, the two networks may be separated and network selection is done by a client application in the mobile device.

In an example, there may be three initiation techniques for data offloading: Wireless Local Area Network (WLAN) scanning initiation, user initiation, and remotely managed initiation. In WLAN scanning based initiation, a user device may be configured to perform WLAN scanning either periodically or in response to a predefined trigger. When a known or an open Wi-Fi network is found, an offloading procedure may be initiated. In the user initiated technique, a user is prompted to select which network technology to use. In the remotely managed approach, a network server may be configured to initiate each offloading procedure by prompting a connection manager of a specific user device. Operator managed initiation may be considered as a subclass of the remotely managed approach. In the operator managed approach, a network operator may monitor network load and user behavior. In the case network congestion, the operator may be configured to initiate offloading procedure.

In an example, the mobile device may be configured to check for availability of a wireless network (e.g., WLAN) at predetermined time intervals. The mobile device may include, for example, a radio module or other transceiver that the mobile device may be configured to use to communicate with a wireless network. In order to check for the availability of the wireless network, the mobile device may be configured to power-up the radio module and then use the radio module to attempt to communicate with the wireless network. If the wireless network is not available, the mobile device may be configured to power-down the radio module until a predetermined time interval has passed, and the mobile device again may be configured to check for the availability of the wireless network. However, powering-up and powering-down the radio module in the mobile device in this manner may consume battery power, which can be undesirable for battery-powered mobile devices. Similarly, continually leaving the radio module scanning an attempting to connect with the wireless network rather than periodically powering-up and down the radio module may also consume battery power and therefore be undesirable. Also, if a user of the mobile device is moving and may leave coverage area of the wireless network within a limited amount of time, there may be no value (e.g., with respect to service cost control, availability of higher bandwidth, or congestion of cellular networks) in wasting battery power to connect to the wireless network.

In an example, the mobile device may be configured to scan for availability of the wireless network, and measure, at the mobile device, signal strengths of a wireless signal from the wireless network. Also, the mobile device may be configured to determine a rate of signal strength change for the wireless signal from the wireless network based on the measured signal strengths; and compare the rate of signal strength change to a threshold value. The rate of signal strength change may be indicative of speed of motion of the mobile device, for example. As an example, if the rate of signal strength change is less than the threshold value, the mobile device may be stationary or moving at a low speed (e.g., a user of the mobile device is walking). Alternatively, if the rate of signal strength change is greater than the threshold value, the mobile device may be moving at a high speed (e.g., a user of the mobile device is travelling in a car). If the rate of signal strength change is less than the threshold value, the mobile device may be configured to establish a connection with the wireless network; if not, the mobile device may be configured to stop scanning for the wireless network. In this manner, the mobile device may be configured to connect to the wireless network if the rate of signal strength change indicates that the mobile device may not leave coverage area of the wireless network after only a short period of time; thus, consuming battery power for scanning and connecting to the wireless network may be justified.

An example mobile device may include a non-transitory computer-readable medium, which has program instructions stored thereon that are executable by at least one processor to provide the functionality described herein.

Figure 1:
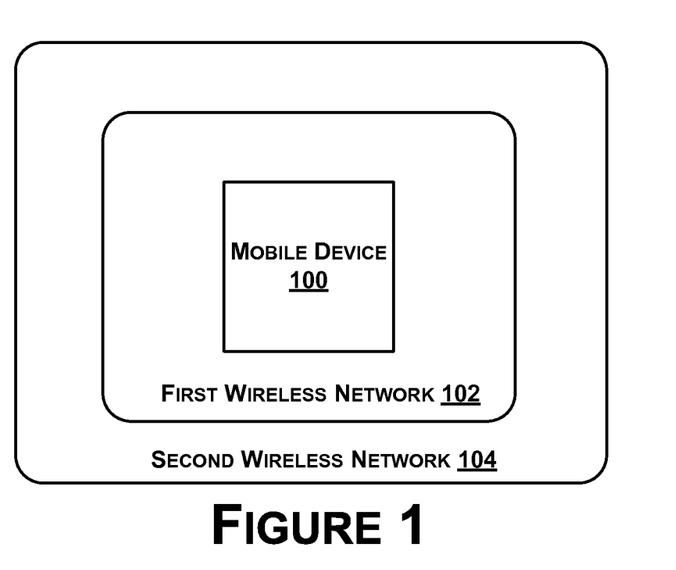
FIG. 1 illustrates a mobile device that can be used to communicate with first and second wireless networks, in accordance with an example embodiment.

Referring now to the Figures, FIG. 1 illustrates a mobile device 100 that can be used to communicate with a first wireless network 102 and a second wireless network 104, in accordance with an example embodiment. The mobile device 100 can be, for example, a mobile telephone, personal digital assistant (PDA), laptop, notebook, or netbook computer, tablet computing device, etc. In some examples, the mobile device 100 may be referred to as a mobile station. The mobile station (MS) may comprise, for example, user equipment and software for communication with a mobile network, and may refer to global system connected to the mobile network, i.e. mobile phone or mobile computer connected using a mobile broadband adapter. In an example, different functions of the mobile station may be performed by distinct processors.

In examples, the mobile device 100 may include one or more radio modules or wireless communication systems that may be configured to be wirelessly coupled to the wireless networks 102 and 104. To this end, the radio module may include an antenna and a chipset for communicating with the networks 102 and 104. The chipset or wireless communication system in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The first and second wireless networks 102 and 104 may be any type of wireless networks. For example, the first wireless network 102 may be a Wireless Local Area Network (WLAN), while the second wireless network 104 may be a Wireless Wide Area Network (WWAN). In this example, the first wireless network 102 may have a smaller coverage area than the second wireless network 104, and thus a user of the mobile device 100 may leave the coverage area of the first wireless network 102, yet remain within the coverage area of the second wireless network 104. These examples are for illustration only, and the first and second wireless networks 102 and 104 may be any other type of wireless network.

The mobile device 100 may be configured to communicate with other devices on the first or second wireless networks 102 and 104 in order to exchange voice, data or other types of information. The first and second wireless networks 102 and 104 may optionally provide connectivity to other networks, thereby also allowing the mobile device 100 to communicate with devices on those other networks.

In an example, the mobile device 100 may be in communication with the second wireless network 104 (e.g., a WWAN) and may be configured to receiving data through the second wireless network 104. The mobile device 100 further may be configured to detect availability of the first wireless network 102 (e.g., a Wi-Fi WLAN), and may be configured to connect to the first wireless network 102 and cause data to be offloaded from the second wireless network 104 and be received through the first wireless network 102.

Figure 2:
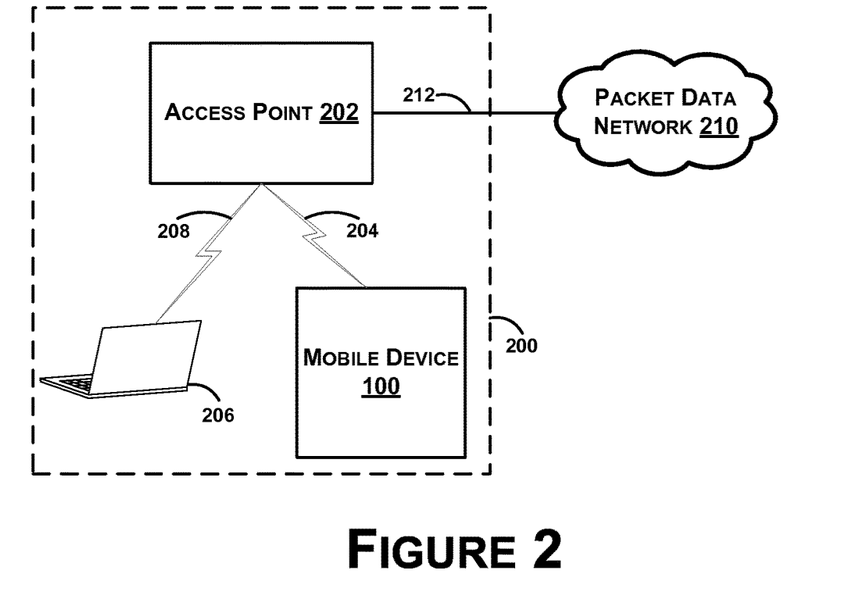
FIG. 2 illustrates a wireless local area network, in accordance with an example embodiment.

FIG. 2 illustrates a wireless local area network (WLAN) 200, in accordance with an example embodiment. The WLAN 200 can be the first wireless network 102 of FIG. 1, for example. Devices on the WLAN 200 may be configured to communicate using one or more of the various IEEE 802.11 standards. IEEE 802.11 specifies various signaling and formatting protocols that can be used by the devices communicating with the WLAN 200. For example, IEEE 802.11 provides protocols for a physical ("PHY") layer, which may be used to transmit bits of information over a wireless interface. IEEE 802.11 also defines a media access control ("MAC") sub-layer, which can be used to format the bits sent over the wireless interface using one of the PHY layer protocols.

The WLAN 200 is depicted in FIG. 2 in a basic service set ("BSS") configuration for illustration. In the BSS configuration, one or more wireless nodes connect with an access point ("AP") 202. As depicted in FIG. 2, the WLAN 200 may include two wireless nodes. The mobile device 100 may be configured to serve as one wireless node and communicate with the AP 202 over an 802.11 wireless air interface 204. A laptop 206, for example, may serve as a second wireless node and may be configured to communicate with the AP 202 over an 802.11 wireless air interface 208. Other types of devices may also serve as wireless nodes. Although FIG. 2 depicts two wireless nodes 100 and 206, the WLAN 200 may include a greater or fewer number of wireless nodes.

In the BSS configuration, the wireless nodes 100 and 206 may be configured to exchange data with each other through the AP 202. For example, the laptop 206 may be configured to send messages to the mobile device 100, and those messages may be routed through the AP 202. Similarly, the mobile device 100 may be configured to send messages to the laptop 206, and those messages may also be routed through the AP 202. Other devices communicating with the AP 202 may exchange messages in a similar manner.

In addition to the BSS configuration, multiple APs can be linked together to form an extended services set ("ESS"). Thus, an ESS can include two or more BSSs. The APs can be linked in a variety of different manners, such as through a wired Ethernet connection. Once linked together, wireless nodes connected to one AP can exchange data with wireless nodes connected to a different AP. Additionally, a wireless node can roam among the different wireless access points in the ESS. Thus, an ESS configuration can extend the range of the WLAN 200 past that of a BSS configuration.

In an example, the AP 202 may be configured to connect to a packet data network 210 via a data link 212. The data link 212 may be a wired or wireless connection. The packet data network 210 may be any type of packet data network, such as an intranet or the Internet. The packet data network 210 may additionally provide connectivity to one or more other packet data networks. Using the connectivity between the AP 202 and the packet data network 210, the mobile device 100 may be configured to communicate with another device connected to the packet data network 210.

The WLAN 200 illustrated in FIG. 2 may be configured to use any of the various 802.11 standards. For example, the WLAN 200 may use the 802.11 a, 802.11b, 802.11g or other standards under the 802.11 standard. It should be understood, however, that IEEE 802.11 is used as an example for illustration and other standards can be used. For example, referring back to FIG. 1, the first wireless network 102 may be configured to use other radio protocols such as a Bluetooth network protocol, Near Field Communication network protocol, or any other type of wireless network protocol.

Figure 3:
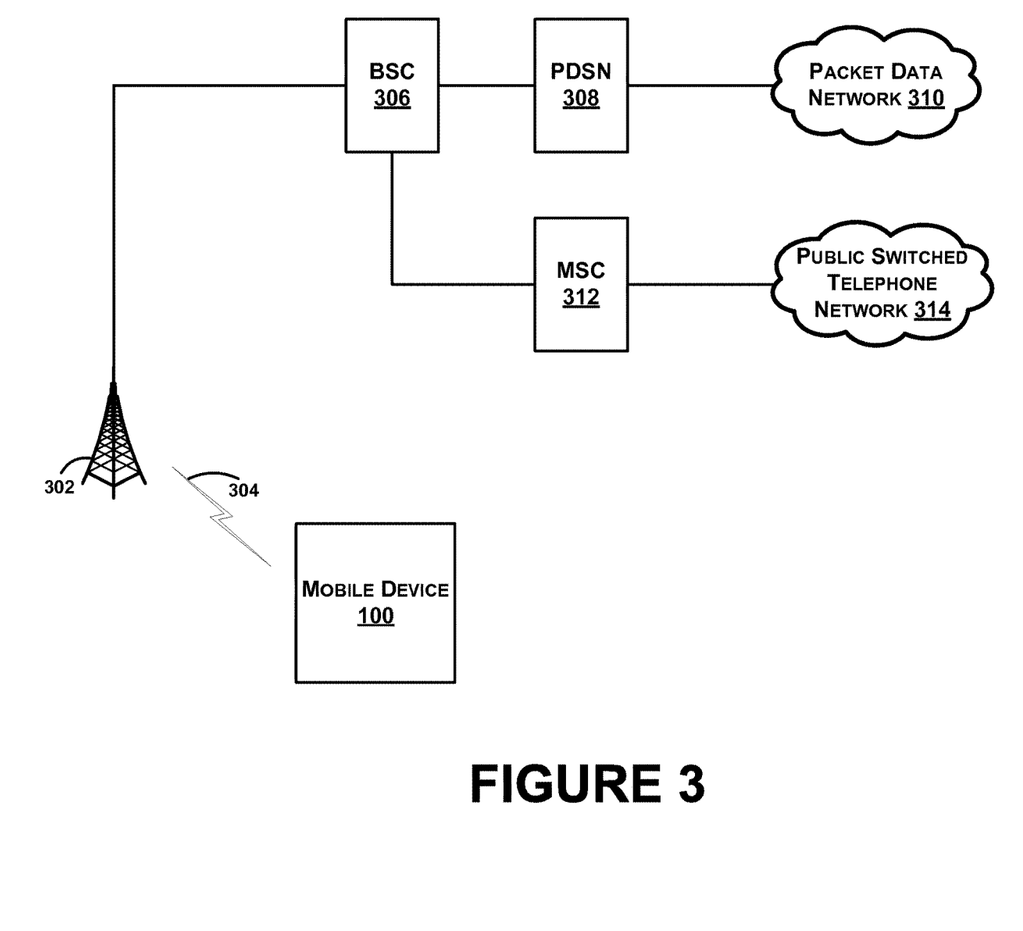
FIG. 3 illustrates a wireless wide area network, in accordance with an example embodiment.

FIG. 3 illustrates a wireless wide area network (WWAN), in accordance with an example embodiment. The WWAN illustrated in FIG. 3 can be the second wireless network 104 of FIG. 1, for example.

As shown in FIG. 3, the mobile device 100 may be configured to communicate with a base transceiver station ("BTS") 302 via an air interface 304. The mobile device 100 may be configured to communicate with the BTS 302 using a variety of different protocols. As examples, the mobile device 100 may be configured to communicate with the BTS 302 via the air interface 304 using a Code Division Multiple Access ("CDMA") protocol, Evolution Data Optimized (EV-DO) protocol, GSM protocol, IEEE 802.16 (WiMAX) protocol, or Long Term Evolution (LTE) protocol. CDMA is described in further detail in Telecommunications Industry Association ("TIN') standards IS-95A and IS-95B. CDMA is also described in the International Telecommunications Union ("ITU") IMT-2000 series of standards. CDMA is further described in the TIA IS-2000 series of standards. Other wireless protocols may also be used.

The BTS 302 may be configured to connect to a base station controller ("BSC") 306, which in turn may be configured to connect to packet data serving node ("PDSN") 308. The PDSN 308 may be configured to connect to a packet data network 310. Using this connectivity, the mobile device 100 may then be configured to communicate with devices on the packet data network 310. Alternatively, the mobile device 100 may be configured to use an Internetworking Function ("IWF") in order to engage in packet data communications with another device on the WWAN or on the packet data network 310. Depending on type of the WWAN, other methods may be used to provide the mobile device 100 with access to the packet data network 310.

Additionally, or alternatively, the mobile device 100 may be configured to access the WWAN by placing a voice call. The BSC 306 may be configured to connect to a mobile switching center ("MSC") 312, which may be configured to connect to the public switched telephone network ("PSTN") 314. The mobile device 100 may be configured to use this connectivity to form a circuit-switched connection with another device on the PSTN. The mobile device 100 then may be configured to send voice traffic to other devices over this connection; however, the mobile device 100 also may be configured to send data over this type of connection. Other types of circuit-switched connections may be used.

It should be understood that the wireless networks depicted in FIGS. 1, 2 and 3 are examples for illustration only. Other network types are possible. It is also not necessary that one wireless network has a larger coverage area than the other wireless network, and it is not necessary that the mobile device 100 be able to communicate with two wireless networks. In alternate examples, the mobile device may be configured to communicate with a greater or fewer number of wireless networks.

Figure 4:
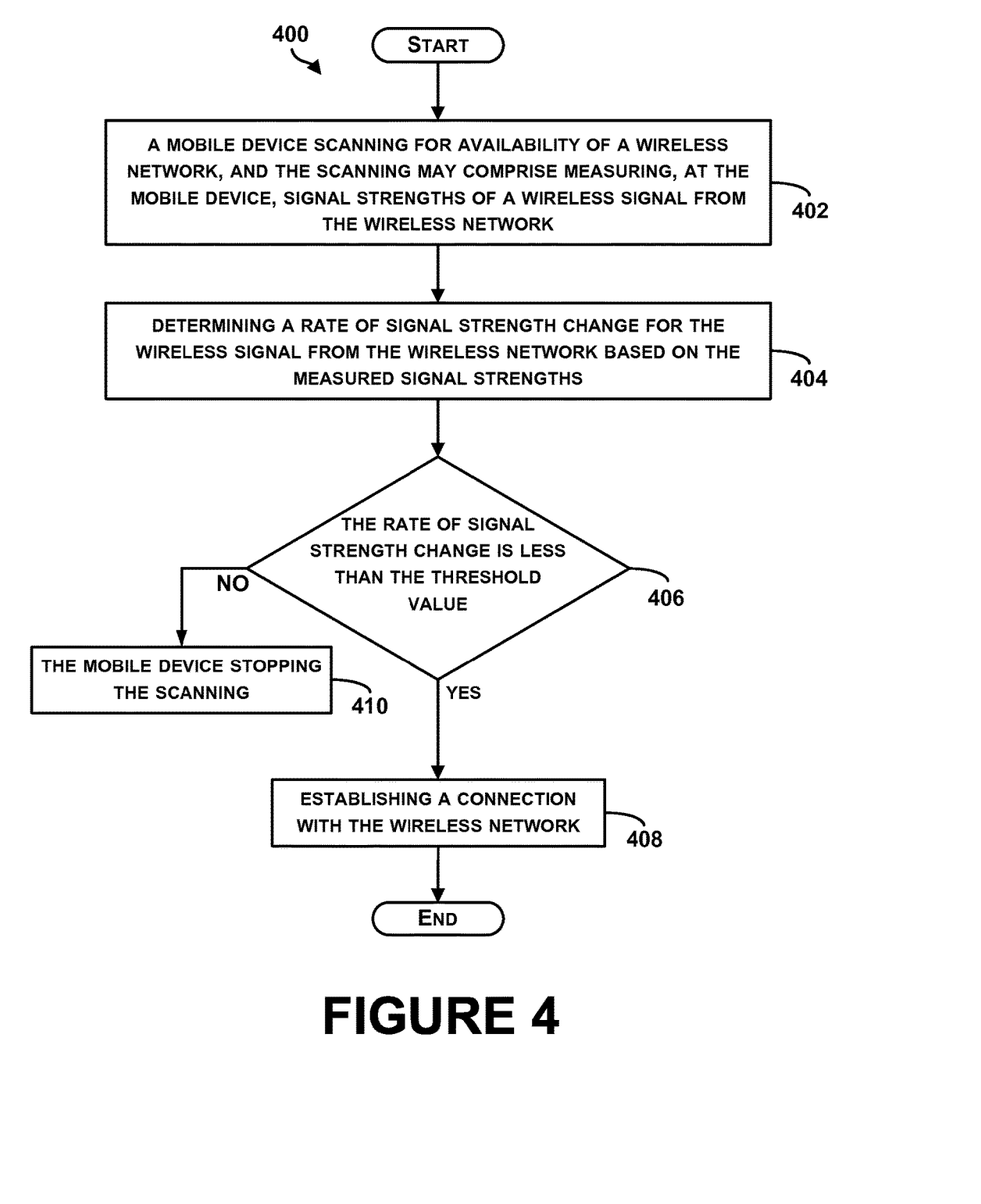
FIG. 4 is a flow chart of a method for selective scanning and connecting to a wireless network, in accordance with an example embodiment.
Figure 5:
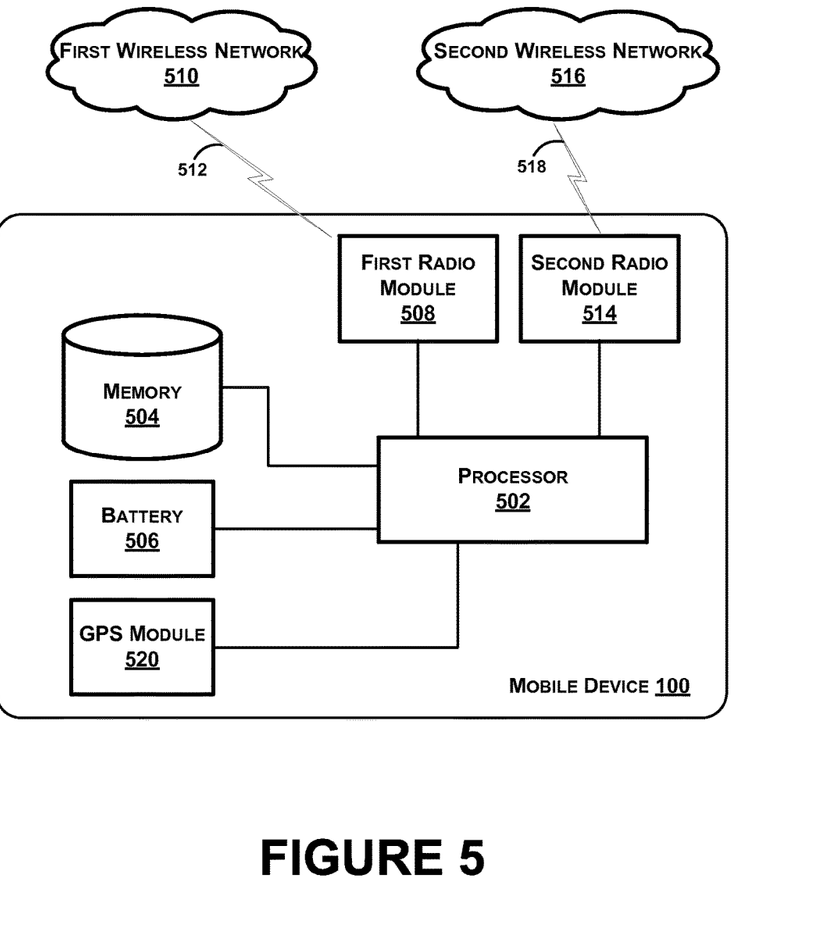
FIG. 5 is a block diagram illustrating components of a mobile device that can be used to communicate with first and second wireless networks, in accordance with an example embodiment.

FIG. 4 is a flow chart of a method 400 for selective scanning and connecting to a wireless network, in accordance with an example embodiment. FIG. 5 is a block diagram illustrating components of the mobile device 100 that can be used to communicate with a first and second wireless networks, in accordance with an example embodiment, to illustrate the method 400. FIGS. 4 and 5 will be described together.

The method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

At block 402, the method 400 includes a mobile device scanning for availability of a wireless network, and the scanning may comprise measuring, at the mobile device, signal strengths of a wireless signal from the wireless network. FIG. 5 illustrates components of the mobile device 100 that may be configured to scan for availability of the wireless network and measure respective signal strengths. The mobile device 100 may include a processor 502 and a data storage or memory 504. The memory 504 may contain instructions (e.g., program logic) executable by the processor 502 to execute various mobile device functions such as the functions described in relation to FIG. 4. Components of the mobile device 100 may be configured to work in an interconnected fashion with each other and/or with other components coupled to respective systems. For example, a power supply or battery 506 may provide power to all the components of the mobile device 100. The processor 502 may comprise one or more general-purpose processors and/or one or more special-purpose processors (e.g., image processor, digital signal processor, etc.). To the extent that the processor 502 includes more than one processor, such processors could work separately or in combination. The memory 504, in turn, may comprise one or more volatile and/or one or more non-volatile storage components, such as optical, magnetic, and/or organic storage, and the memory 504 may be integrated in whole or in part with the processor 502.

The mobile device 100 may include a first radio module 508 for communicating with the first wireless network 510 via a first wireless interface 512. The first wireless network 510, for example, may be a wireless local network (WLAN) and the first wireless interface 512 may utilize an IEEE 802.11 air interface protocol. The mobile device 100 may be configured to scan for availability of the first wireless network 510, using the first radio module 508, at a current location of the mobile device 100.

In an example, scanning for the first wireless network 510 may include measuring signal strengths of a wireless signal received at the mobile device 100 from the first wireless network 510. For example, the mobile device 100 may be configured to determine, for the wireless signal, a received signal strength indicator (RSSI), which is a measurement of power present in a received radio signal. RSSI can be determined in intermediate frequency (IF) stage before an IF amplifier in the first radio module 508, for example. In zero-IF systems, RSSI can be determined in a baseband signal chain, before a baseband amplifier in the first radio module 508. In one example, RSSI output may be a DC analog level. In another example, RSSI can also be sampled by an internal Analog to Digital Converter and resulting codes may be available directly or via peripheral or internal processor bus to the processor 502.

In an example, in an IEEE 802.11 network, RSSI may be indicative of relative strength of a received signal in a wireless environment, in arbitrary units. In this example, RSSI may be an indication of power level of a signal received by the first radio module 508. Therefore, the higher the RSSI number (or less negative in some devices), the stronger the signal.

Additionally or alternatively, to determine a measure of signal strength, the mobile device 100 may be configured to determine a Received Channel Power Indicator (RCPI), which is an IEEE 802.11 measure of received radio frequency power, in a selected channel over a preamble stage of an IEEE 802.11 received signal frame. Other signal strengths metrics are possible as well.

The mobile device 100 also may include a second radio module 514 for communicating with a second wireless network 516 via a second wireless interface 518. The radio modules 508 and 514 may vary with the types of the first and second wireless networks 510 and 516. In an example, the second wireless network 516 may be a wireless wide area network (WWAN) such as CDMA, EV-DO, LTE, WiMAX, or GSM. Thus, the second radio module 514 may be a WWAN radio module and the first radio module 508 may be a WLAN radio module, and the second wireless interface

518 may be the air interface 304 of FIG. 3, while the first wireless interface 512 may be the 802.11 interface 204 of FIG. 2. However, the types of wireless interfaces 512 and 518 may vary with the types of wireless networks. In examples, the first wireless network 510 may have a smaller coverage area than the second wireless network 516, and thus a user of the mobile device 100 may be moving and may leave the coverage area of the first wireless network 102, yet remain within the coverage area of the second wireless network 104.

In some examples, the radio modules 508 and 514 may be separate components in the mobile device 100. For example, the radio modules 508 and 514 may be separate application specific integrated circuits ("ASICs"), antenna systems or other separate components. Alternatively, the radio modules 508 and 514 may be integrated into a single ASIC, such as a dual mode ASIC. In an example, the radio modules 508 and 514 may also be integrated into a single component in the mobile device 100 other than an ASIC. Although FIG. 5 depicts two radio modules 508 and 514 in the mobile device 100, the mobile device 100 may include a greater or fewer number of radios and may be configured to communicate with a greater or fewer number of wireless networks.

The radio modules 508 and 514 may connect to the mobile device 100 in a variety of different ways. For example, the radio modules 508 and 514 may connect to the mobile device 100 through a serial port, a parallel port, a Personal Computer Memory Card International Association ("PCMCIA") slot, a Universal Serial Bus ("USB") port, a SD slot, a compact flash slot, a firewire connection or another type of connection. Thus, the radio modules 508 and 514 may be removable such that a user of the mobile device 100 can add or remove radio modules in order to change respective wireless networks with which the mobile device 100 can communicate. Alternatively, the radio modules 508 and 514 may be permanently connected to the mobile device 100 such that the user of the mobile device 100 cannot add or remove radio modules.

Referring back to FIG. 4, at block 404, the method 400 includes determining a rate of signal strength change for the wireless signal from the wireless network based on the measured signal strengths. Referring to FIG. 5, based on the measured signal strengths or a metric indicative of the signal strengths such as RSSI of a wireless signal received from the first wireless network 510, the mobile device 100 may be configured to determine a rate of signal strength change. For example, the rate of signal strength change may be determined as a magnitude of change in the signal strengths of the wireless signal from the first wireless network 510 over a predetermined period of time. The rate of signal strength change may be indicative of speed of motion of the mobile device 100, for example. As an example, if the rate of signal strength change is low, the mobile device 100 may be stationary or moving at a low speed (e.g., a user of the mobile device 100 is walking). As another example, if the mobile device 100 is used by a user moving at a high speed (e.g., travelling in a car) toward a high signal strength region of the first wireless network 510 and then move away from the high signal strength region, the rate of signal strength change may be high and may change signs (e.g., from positive rate of change to negative rate of change). These examples are for illustration only, other scenarios are possible.

Referring back to FIG. 4, at decision block 406, the method 400 includes determining whether the rate of signal strength change is less than the threshold value. The mobile device 100, in FIG. 5, may be configured to compare the determined rate of signal strength change to a threshold value to determine whether the mobile device 100 is moving at a speed less than or greater than a threshold speed. As an example, the threshold value may correspond to the threshold speed such that the rate of signal strength change being greater than the threshold value may indicate that the user of the mobile device 100 is travelling in a car; and the rate of signal strength change being less than the threshold value may indicate that the user of the mobile device 100 substantially stationary or walking.

Referring back to FIG. 4, at block 408, the method 400 includes, if the rate of signal strength change is less than the threshold value, establishing a connection with the wireless network. The rate of signal strength change being less than the threshold value, may indicate that the mobile device 100, in FIG. 5, is substantially stationary or moving at a low speed (e.g., walking) and may thus remain within a coverage area of the first wireless network 510 for a period of time that may make a connection with the first wireless network 510 worthwhile. In this case, the mobile device 100 may be configured to use the first radio module 508 to associate with and authenticate the first wireless network 510 through the first air interface protocol 512. The mobile device 100 may be configured to begin communicating with the first wireless network 510 and exchange voice, data or other traffic over the first wireless network 510.

Referring back to FIG. 4, at block 410, the method 400 includes the mobile device stopping the scanning. If the rate of signal strength change is greater than the threshold value, the mobile device 100, in FIG. 5, may be moving at a speed above the threshold speed and may thus leave coverage area of the first wireless network 510 after only a short period of time. In this case, the mobile device 100 may be configured to stop scanning and may not associate and authenticate with the first wireless network to conserve battery power. In an example, the mobile device 100 may be configured to stop scanning for the first wireless network 510 and may be configured to disable the first radio module 508 to conserve power of the battery 506.

In one example, the mobile device 100 may be configured to stop scanning for a predetermined amount of time before scanning again for availability of the first wireless network 510.

In some examples, strength of signals of wireless networks may fluctuate over time, e.g., temporary drops in signal strength may occur. In these examples, the mobile device 100 may be configured to distinguish whether a change in signal strength is due to motion of the mobile device 100 or due to fluctuations in signal strengths of the first wireless network 510 due to other factors. For example, the mobile device 100 may be configured to confirm that the change is due to motion of the mobile device 100 by receiving information from a Global Position System (GPS) module 520, coupled to the mobile device 100 and in communication with the processor 502, to confirm a location change corresponding to the change in signal strength. In another example, the mobile device 100 may be configured to repeat determination of the rate of signal strength change over predetermined intervals of time to determine whether the change in signal strength is sustained or temporary. In still another example, in the case of the second wireless network 516 being a WWAN, the mobile device 100 may be configured to determine that the mobile device 100 has changed location by detecting a change in relative strengths of pilot signals of one or more base stations with which the mobile device 100 is communicating over the second wireless network 516. The mobile device 100 may be configured to detect handing off between base stations indicating motion and location change of the mobile device 100. Other examples are possible.

In an example, the mobile device 100 may be communicating with the second wireless network 516 and may be configured to measure, at the mobile device 100, respective signal strengths of a respective wireless signal from the second wireless network 516. The mobile device 100 may be configured to determine a second rate of signal strength change for the second wireless signal from the second wireless network 516; and compare the second rate of signal strength change to a second threshold value. If the second rate of signal strength change is less than the second threshold value (indicating that the mobile device 100 may be substantially stationary or moving at a speed less than a threshold speed), the mobile device 100 may be configured to enable the first radio module 508 to scan for availability of the first wireless network 510 as described above at block 402 of the method 400. If the second rate of signal strength change is greater than the second threshold value (indicating that the mobile device 100 may be moving at a speed greater than the threshold speed), the mobile device 100 may be configured to disable the first radio module 508 from scanning for availability of the first wireless network 508. Enabling the radio module 508 may comprise powering-up the radio module 508, and disabling the radio module 508 may comprise powering-down the radio module 508.

As previously described, in an example, the first wireless network 510 may be a WLAN, while the second wireless network 516 may be a WWAN. In this example, the first wireless network 510 may have faster access speeds, lower costs or other factors that make using the first wireless network 510 preferable to using the second wireless network 516. Thus, when the first wireless network 510 is available, the mobile device 100 may be configured to attempt to connect to the first wireless network 510. However, the WLAN 510 may have a limited coverage area as compared to the WWAN 516. The mobile device 100 may be configured to determine, based on the rate of signal strength change associated with the WLAN 510, that the mobile device 100 may be moving at a high speed and may leave the limited coverage area of the WLAN 510 within a short period of time. In this case, using battery power to connect to the WLAN 100 may not be worthwhile, and the mobile device 100 may be configured to not scan for availability of the WLAN 510. The mobile device 100 may be configured to remain connected to the WWAN 516 to receive various types of data.

In order to conserve the battery 506, the mobile device 100 may be configured to power-down the radio modules 508 and 514, at least for a predetermined amount of time, when the mobile device is not communicating with respective wireless networks 510 and 516. For example, the mobile device 100 may be configured to power-down the second radio module 514 when the mobile device 100 is not communicating with the second wireless network 516. Even if the radio modules 508 and 514 are included in a single chip, they may be separately powered-up and powered-down. In order to later access one of the networks 510 and 516, the mobile device 100 can then power-up a corresponding radio module. For example, the mobile device 100 can power-up the first radio module 508 to access the first wireless network 510, and can power-up the second radio module 514 to access the second wireless network 516.

In one example, upon establishing connection with the first wireless network 510, the mobile device 100 may be configured to continue to monitor and use the second wireless network 516 as well. In this example, the mobile device may be configured to receive voice calls, for example, over the second wireless network 516, but may be configured to receive data (e.g., through the internet) over the first wireless network 510. In another example, however, the mobile device may be configured to disconnect from the second wireless network 516, when a connection is established with the first wireless network 510.

Figure 6:
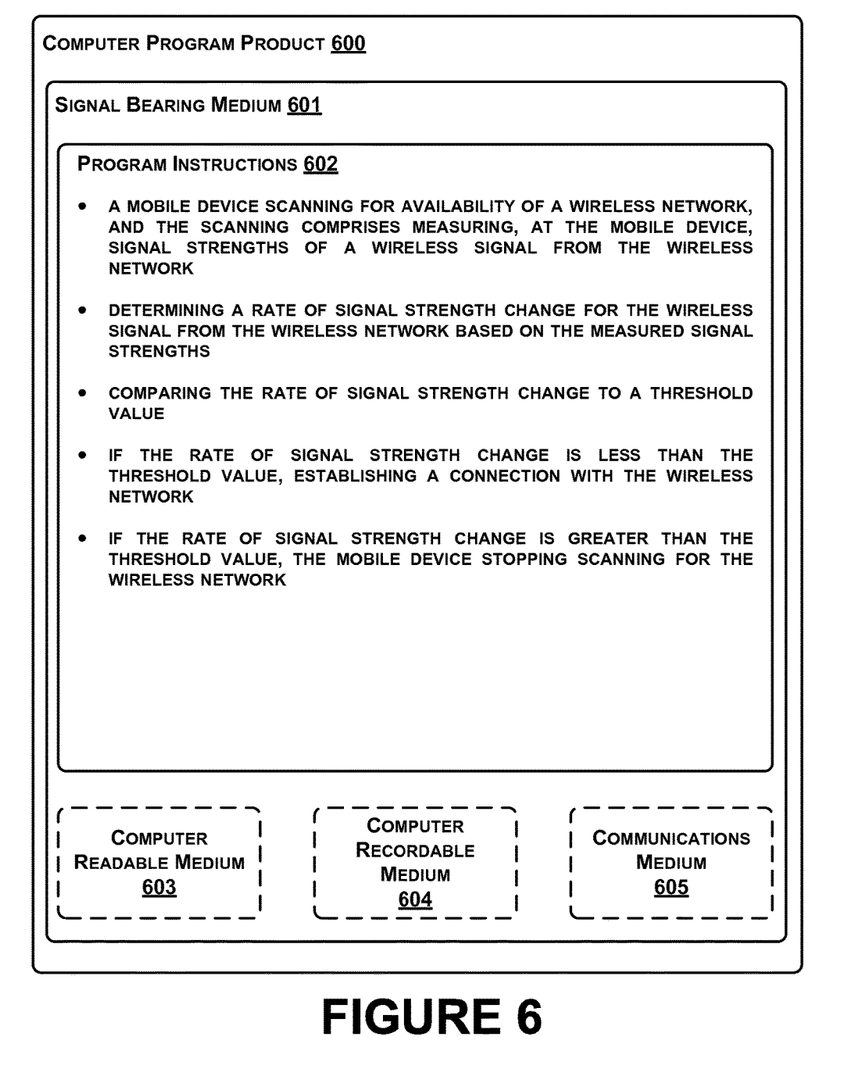
FIG. 6 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors may provide functionality or portions of the functionality described above with respect to FIGS. 1-5. Thus, for example, referring to the embodiments shown in FIG. 4, one or more features of blocks 402-410 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. For example, the computer-readable medium 603 could correspond to the memory 504 in FIG. 5. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device described with respect to FIGS. 1-5 may be configured to provide various operations, functions, or actions in response to the programming instructions 602 conveyed to the computing device by one or more of the computer readable medium 603, the computer recordable medium 604, and/or the communications medium 605. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
measuring, at a mobile device connected to a cellular wireless network, two or more cellular signal strengths of a cellular wireless signal from the cellular wireless network;
based on the two or more measured cellular signal strengths, determining a rate of cellular signal strength change;
determining that the rate of cellular signal strength change is less than a first threshold value;
based on the rate of cellular signal strength change being less than the first threshold value, initiating scanning, by the mobile device, for availability of a wireless local area network (WLAN), wherein the scanning comprises measuring, at the mobile device, two or more WLAN signal strengths of a WLAN wireless signal from the WLAN;
based on the two or more measured WLAN signal strengths, determining a rate of WLAN signal strength change for the WLAN wireless signal;
determining that the rate of WLAN signal strength change is less than a second threshold value; and
based on the rate of WLAN signal strength change being less than the second threshold value, establishing a connection with the WLAN wireless network.

2. The method of claim 1, wherein the mobile device is configured to communicate with the WLAN wireless network using a first air interface protocol, and with the cellular wireless network using a second air interface protocol different than the first air interface protocol.

3. The method of claim 2, wherein the first air interface protocol is an IEEE 802.11 protocol, and the second air interface protocol is a CDMA protocol, EV-DO protocol, GSM protocol, IEEE 802.16 protocol, or LTE protocol.

4. The method of claim 1, further comprising:
the mobile device receiving data via the connection with the WLAN wireless network.

5. The method of claim 4, further comprising, when the connection with the WLAN wireless network is established, disconnecting from the cellular wireless network.

6. The method of claim 4, further comprising, when the connection with the WLAN wireless network is established, the mobile device monitoring the cellular wireless network.

7. The method of claim 1, wherein the rate of WLAN signal strength change being less than the second threshold value indicates that the mobile device has a speed below a threshold speed.

8. A non-transitory computer readable medium having stored thereon instructions that, when executed by a processor of a mobile device, cause the mobile device to perform operations comprising:
measuring, while connected to a cellular wireless network, two or more cellular signal strengths of a cellular wireless signal from the cellular wireless network;
based on the two or more measured cellular signal strengths, determining a rate of cellular signal strength change;
determining that the rate of cellular signal strength change is less than a first threshold value;
based on the rate of cellular signal strength change being less than the first threshold value, initiating scanning for availability of a wireless local area network (WLAN), wherein the scanning comprises measuring two or more WLAN signal strengths of a WLAN wireless signal from the WLAN;
based on the two or more measured WLAN signal strengths, determining a rate of WLAN signal strength change for the WLAN wireless signal;
determining that the rate of WLAN signal strength change is less than a second threshold value; and
based on the rate of WLAN signal strength change being less than the second threshold value, establishing a connection with the WLAN wireless network.

9. The non-transitory computer readable medium of claim 8, wherein determining the rate of WLAN signal strength change comprises determining a magnitude of change in the two or more WLAN signal strengths over a predetermined period of time.

10. The non-transitory computer readable medium of claim 8, wherein the WLAN uses an IEEE 802.11 protocol.

11. A mobile device comprising:
a first radio module for communication with a wireless local area network (WLAN);
a second radio module for communication with a cellular wireless network;
a processor; and
a memory, the memory storing instructions that, when executed by the processor, cause the mobile device to perform operations comprising:
measuring, by the second radio module while connected to a cellular wireless network, two or more cellular signal strengths of a cellular wireless signal from the cellular wireless network;
based on the two or more measured cellular signal strengths, determining a rate of cellular signal strength change;
determining that the rate of cellular signal strength change is less than a first threshold value;
based on the rate of cellular signal strength change being less than the first threshold value, initiating scanning, using the first radio module, for availability of the WLAN, wherein the scanning comprises measuring, at the mobile device, two or more WLAN signal strengths of a WLAN wireless signal from the WLAN;
based on the two or more measured WLAN signal strengths, determining a rate of WLAN signal strength change for the WLAN wireless signal;
determining that the rate of WLAN signal strength change is less than a second threshold value; and
based on the rate of WLAN signal strength change being less than the second threshold value, establishing a connection with the WLAN wireless network.

12. The mobile device of claim 11, wherein enabling the mobile device to scan for the availability of the WLAN wireless network comprises powering-up the first radio module.

13. The mobile device of claim 11, wherein the WLAN wireless network uses an IEEE 802.11 protocol, and the cellular wireless network uses a CDMA protocol, EV-DO protocol, GSM protocol, IEEE 802.16 protocol, or LTE protocol.

14. The mobile device of claim 11, wherein the WLAN rate of signal strength change being less than the second threshold value indicates that the mobile device has a speed below a threshold speed.

15. The method of claim 1, wherein establishing the connection with the WLAN wireless network is also based on receiving information from a Global Positioning System (GPS) indicating a location change of the mobile device.

* * * * *